United States Patent
Heider et al.

(10) Patent No.: US 9,210,168 B2
(45) Date of Patent: Dec. 8, 2015

(54) INTERNET-SMART-CARD

(75) Inventors: Axel Heider, Taufkirchen (DE); Erich Englbrecht, München (DE)

(73) Assignee: Giesecke & Devrient GmbH, Munich (DE)

( * ) Notice: Subject to any disclaimer, the term of this patent is extended or adjusted under 35 U.S.C. 154(b) by 571 days.

(21) Appl. No.: 12/738,754

(22) PCT Filed: Oct. 15, 2008

(86) PCT No.: PCT/EP2008/008741
§ 371 (c)(1),
(2), (4) Date: Apr. 19, 2010

(87) PCT Pub. No.: WO2009/052983
PCT Pub. Date: Apr. 30, 2009

(65) Prior Publication Data
US 2010/0217799 A1    Aug. 26, 2010

(30) Foreign Application Priority Data
Oct. 24, 2007   (DE) .......................... 10 2007 050 836

(51) Int. Cl.
G06F 15/16 (2006.01)
H04L 29/06 (2006.01)
H04L 29/08 (2006.01)

(52) U.S. Cl.
CPC ............ *H04L 63/0853* (2013.01); *H04L 67/02* (2013.01); *H04L 67/2814* (2013.01)

(58) Field of Classification Search
USPC ........................................................ 709/203
See application file for complete search history.

(56) References Cited

U.S. PATENT DOCUMENTS

| 7,185,064 B1 * | 2/2007 | Mariana ........................ 709/217 |
| 8,447,836 B2 * | 5/2013 | Mahalal et al. ............... 709/219 |
| 2002/0138549 A1 * | 9/2002 | Urien ............................ 709/202 |
| 2005/0071282 A1 * | 3/2005 | Lu et al. ......................... 705/64 |
| 2005/0184163 A1 | 8/2005 | De Jong |

FOREIGN PATENT DOCUMENTS

| DE | 102005030305 A1 | 1/2007 |
| EP | 1457904 A1 | 9/2004 |
| EP | 1393523 B1 | 5/2006 |
| EP | 2001202 A1 | 12/2008 |
| WO | 2005064889 A1 | 7/2005 |

OTHER PUBLICATIONS

International Search Report in PCT/EP2008/008741, Feb. 26, 2009.

* cited by examiner

*Primary Examiner* — Esther B Henderson
(74) *Attorney, Agent, or Firm* — Workman Nydegger

(57) ABSTRACT

On a portable data carrier (2) with a communication interface (5) and a control device (5) the control device (4) allows a transaction in a communication network (10) between a communication device (1) connected with the data carrier (2) via the communication interface (5) and a network server (3). For this purpose the control device (4) sends, in response to a request (S2; S15) concerning a transaction between the communication device (1) and a network server (3), received from the connected communication device (1) via the communication interface (5), a request redirection message (S3; S19) concerning the transaction to the communication device (1).

16 Claims, 2 Drawing Sheets

INTERNET-SMART-CARD

FIELD OF THE INVENTION

The present invention relates to a method for carrying out a transaction in a communication network between a communication device and a network server via a portable data carrier connected with the communication device and such a data carrier.

BACKGROUND

An Internet smart card is connected with a communication device, such as e.g. a personal computer or a laptop or the like, via a standardized interface, such as e.g. a USB interface, and provides a secure connection establishment with a trustworthy web-based service, such as e.g. online banking, e-learning or the like. The Internet smart card thereby makes sure among other things that a user who selects a web server in the Internet via a web browser installed on his communication device reaches a trustworthy web site and is not for example diverted or manipulated.

To implement this security functionality an Internet smart card requires a routing mechanism forwarding an http request by a web browser to the Internet web server in question, and returning an http response from the Internet web server to the user's web browser in response to the http request. For this purpose the Internet smart card usually establishes a TCP/IP connection with the Internet server in question.

In EP 1 393 523 B1 a corresponding procedure with an Internet smart card is described. In this solution the Internet smart card additionally assumes the administration of cookies.

The above-mentioned routing mechanism is for example provided by the Internet Connection Sharing feature (ICS) of the operating system Microsoft Windows®. An ICS can provide a connection establishment only for one physical interface of the Internet smart card in each case, so that e.g. upon switching from a contact-type data communication to a contactless data communication the ICS has to be deactivated and reactivated. Installing a routing functionality furthermore requires administration rights and, in addition to the usual Internet access of the web browser, a separate Internet access of the Internet smart card. Furthermore the high data traffic to and from the Internet smart card can possibly be problematic due to the limited resources of a smart card.

SUMMARY

Accordingly, it is the object of the present invention to allow an efficient transaction between a communication device and a network server in a communication network, with the transaction being secured by a portable data carrier connected with the communication device.

The object is achieved by a method for carrying out a transaction in a communication network between a communication device and a network server via a portable data carrier connected with the communication device and such a portable data carrier with the features of the independent claims. Advantageous embodiments and further developments of the invention are specified in the dependent claims.

According to the invention a transaction between a communication device and a network server in a communication network is initiated via a portable data carrier connected with the communication device by a request concerning the transaction from the communication device to the data carrier. In response to the received request the data carrier sends a request redirection message concerning the transaction with the network server to the communication device. A portable data carrier equipped for implementing this method comprises a communication interface and a control device, the control device allowing the transaction between the communication device and a network server. For this purpose the control device of the portable data carrier, in response to a request concerning the transaction, received from the connected communication device via the communication interface, sends a request redirection message concerning this transaction to the communication device.

According to the invention the portable data carrier thus does not forward a request by means of a routing functionality via a separate access to the communication network to the network server in question, but responds to the request by a request redirection message which comprises transaction-specific data and puts the requesting communication device in a position to establish an independent, direct connection via the communication network with the network server, and to carry out the further transaction with the network server substantially independently of the portable data carrier.

On the one hand this limits the data traffic to the portable data carrier and on the other hand no independent access of the data carrier to the communication network in question is required, but any local communication connection with the communication device is sufficient, which is given anyway via the interface facility of the portable data carrier.

Preferably a portable data carrier can actively require a request concerning a certain transaction from the communication device and thereby initiate the transaction. For this purpose the data carrier sends a transaction demand message to the communication device, causing the communication device to send the request concerning the desired transaction to the data carrier. The data carrier can display the transaction demand message via a browser activated on the communication device, said browser being able to display web sites which are retrievable in the communication network. The user of the communication device will thus demand that a corresponding request is directed to the data carrier, for example by clicking on a control surface or link on the web site displayed by the browser.

Via this mechanism the data carrier on the one hand can initiate a transaction between a communication device and a network server and does not depend on a user starting the transaction for example via a browser, which can carry out the transaction with the network server via the communication network. The data carrier can thereby cause for example an uploading of data to the network server or a downloading of data from the network server.

The control device of the data carrier can integrate into the request redirection message to the communication device transaction data and/or payload data which are integrated by the communication device into a redirected request directed to the network server. The transaction data here can represent e.g. a cryptographic signature of the transaction concerning the request by the communication device. This signature of the transaction is then sent by the control device via the request redirection message and the redirected request to the network server which, by checking the signature, can determine whether the transaction of the communication device is authorized by the data carrier. Furthermore the transaction data can also represent other authentication data of the communication device or of a user of the communication device vis-à-vis the portable data carrier, by means of which it can be proven to the network server that the user is known to the portable data carrier.

Generally the transaction data sent within the framework of the request redirection message from the data carrier to the communication device and from there onward to the network server can be command data to the communication device and/or to the network server which cause the recipient to execute a certain command. In this context such command data to the network server can concern a downloading of payload data present on the network server to the data carrier. The network server then sends the required payload data to be downloaded in its response to the redirected request to the communication device and the communication device forwards the received payload data to be downloaded to the data carrier.

Likewise the request redirection message can comprise command data to the network server and payload data, with the command data concerning an uploading of the payload data to the network server. In this case the command data and the payload data, after receipt, are integrated by the communication device into the redirected request to the network server and sent to the same. The network server finally stores the received payload data in the communication network in such a fashion that they are accessible via a browser.

The data communication between the communication device and the data carrier is preferably carried out according to the http communication protocol, so that the communication device sends an http request to the data carrier and the data carrier responds with an http request redirect.

Preferably the communication network is the Internet and the network server is a web server in the Internet. On the communication device a web browser is installed via which a user can initiate a desired transaction with an Internet web server. For this purpose the user registers with the portable data carrier prior to the transaction by entering an identifying code on a web site displayed by the data carrier on the web browser. The portable data carrier evaluates the code and, when indicated, enables the user to carry out transactions. To this end the web browser preferably establishes a secure connection with the portable data carrier, preferably an SSL connection or the like.

The user can initiate the desired transaction by selecting a link displayed on the web browser and thereby cause the sending of the corresponding http request to the data carrier by the web browser of the communication device. The web browser receives also the subsequent request redirection message of the data carrier and integrates the transaction data and/or payload data of the request redirection message into a redirected http request that is directed to the Internet web server.

The communication between the communication device or its web browser and the Internet web server is carried out according to the http protocol. Correspondingly the transaction between the communication device and the Internet web server does not necessarily require a TCP/IP connection between the data carrier and the Internet server. Insofar the data carrier does not need a routing functionality either, since the actual transaction is carried out via a direct http connection between the web browser and the Internet server.

The data carrier is preferably an Internet smart card (ISC) with a separate, internal web server which provides contents in the form of HTML files. Such an Internet smart card is preferably connected with a computer or a similar communication device via corresponding USB interfaces of the computer and the Internet smart card, the computer having its own Internet access, via which the transaction with the Internet server in question is finally carried out. The task of the Internet smart card in this context is on the one hand to provide a trustworthy Internet address of the Internet server with which the user desires a transaction, and on the other hand to authorize the user or the transaction in question vis-à-vis this Internet web server.

Of course the described concept can be implemented using any other portable data carriers, interfaces and communication devices for realizing transactions in any desired communication network according to suitable communication protocols, provided that the devices and protocols in question allow the above-described procedure. A limitation of the invention to the Internet as communication network and a transaction between a communication device with a web browser and an Internet web server via the http protocol insofar represents merely a particularly preferred embodiment of the invention.

BRIEF DESCRIPTION OF THE DRAWINGS

Further advantages of the invention will result from the following description of different inventive embodiments and alternatives. Reference is made to the following figures, which show.

DETAILED DESCRIPTION OF VARIOUS EMBODIMENTS

Figure 1:
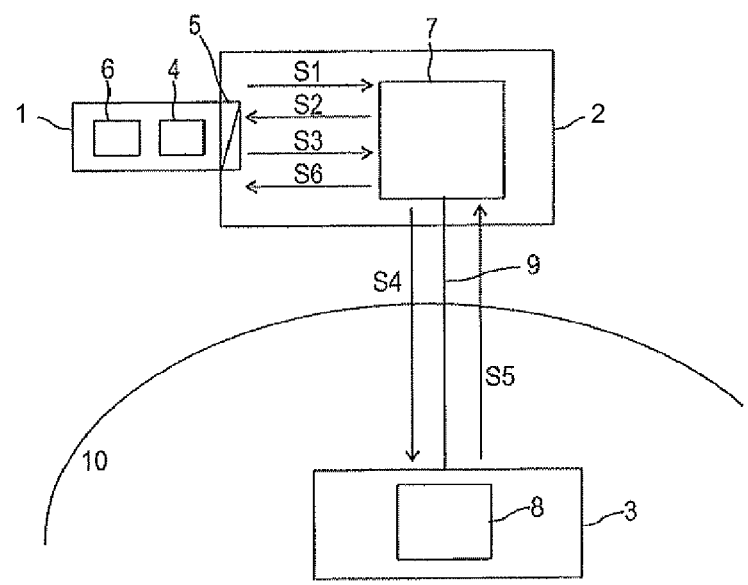
FIG. 1 an arrangement consisting of a computer, an Internet server and an Internet smart card.

FIG. 1 shows an Internet smart card 1 connected with a computer 2. A usual form of connecting such a portable data carrier with a computer 2 is to connect the data carrier with the computer 2 via corresponding USB interfaces 5 of the computer 2 and the Internet smart card 1. The Internet smart card 1 offers a user of the computer 2 who wishes to select an Internet server 3 on the Internet 10 via a browser 7 executable on the computer 2, a secure connection establishment with the Internet server 3. This security functionality of the Internet smart card 1 comprises in particular securing that a user really selects the desired web site of his Internet server via the browser 7, and is not diverted to a manipulated web site. Furthermore the Internet smart card 1 can provide authentication and authorization functionalities, e.g. identifying a user to the Internet smart card 1 or to an Internet sever 3 or authorizing a transaction desired by the user vis-à-vis the Internet server.

Usually a transaction between a browser 7 operated by a user and an Internet server 3 comprises the sending of a corresponding request from the browser 7 to the Internet server 3 and the responding to this request by the Internet server 3 to the browser 7. By inserting the Internet smart card 1 such a request by a user started via the browser 7 is first sent via the USB interface 5 to a control device 4 of the Internet smart card 1 which then coordinates the further connection establishment with the Internet server 3. In the steps S1 to S6 illustrated in FIG. 1, however, a transaction proceeds from the Internet smart card 1 or its control device 4, in that the control device 4 in step S1 sends a transaction demand message to the browser 7 so as to cause it to start a transaction with a corresponding http request.

By the incoming transaction demand message the browser 7 of the computer 2 is activated and e.g. a web site is displayed on the browser 7 via which it is demanded of the user of the computer 2 to carry out a certain interaction, e.g. to click on a control surface displayed on the web site or a link. The purpose of such a transaction proceeding from the Internet smart card 1 between the browser 7 and the Internet server 3 can e.g. be an uploading of payload data present in the memory 6 of the Internet smart card 1 to the Internet server 3 or a downloading of payload data present in the memory 8 of the Internet server 3 to the Internet smart card 1.

When the user clicks on the link displayed on the browser 7 via the transaction demand message, in step S2 an http request is sent by the browser 7 to the control device 4 via the USB interface 5. The control device 4 then in step S3 returns a request redirection message to the browser 7, preferably in the form of an http redirection message ("http redirect"). The request redirection message comprises data and information putting the browser 7 in a position to independently establish contact with the desired Internet server 3 via an Internet connection 9 of the computer 2 to the Internet 10. For example the request redirection message can contain transaction data and/or payload data which the browser 7 in step S4 integrates into a redirected http request to the Internet server 3.

Such transaction data can for example represent an authentication of the Internet smart card 1 vis-à-vis the Internet server 3 or a cryptographic signature of the transaction initiated by the browser 7. Such a cryptographic signature is for example generated by a cryptography module (not shown) of the Internet smart card 1 on the basis of the received http request and in the simplest case represents the cryptographic signature of the complete http request or of parts of the http request. After receipt of this signature the Internet server 3 can then check whether the http request directed to it in step S4 corresponds to the http request originally directed to the data carrier in step S2. In the latter case the Internet server 3 responds to the redirected http request of the browser 7, thereby continuing the transaction. By evaluating the cryptographic signature the Internet server 3 can thus ensure that the redirected http request directed to it corresponds to the http request authorized by the Internet smart card 1 before. The http response by the Internet server 3 can finally be forwarded in step S6 from the browser 7 to the control device 4 of the Internet smart card 1.

Payload data which the control device 4 sends in step S3 to the browser 7 by means of the request redirection message can be data to be uploaded to the Internet server 3, which the Internet server 3 stores in a memory 8 in such a fashion that the data are freely retrievable in the Internet. Furthermore the request redirection message can comprise transaction data commanding the browser 7 and/or the Internet server 3 with regard to the transaction, for example by a command to the browser 7 to establish a secure (SSL) connection 9 to the Internet server 3.

Likewise, the control device 4 can actively require payload data from the Internet server 3. In this case the request redirection message comprises command data to the browser 7 and the Internet server 3 identifying the payload data to be downloaded from the Internet server 3. The payload data to be downloaded which are retrieved from the memory 8 by the Internet server 3 are then in steps S5 and S6 sent to the Internet smart card 1 as required in the form of an http response.

Figure 2:
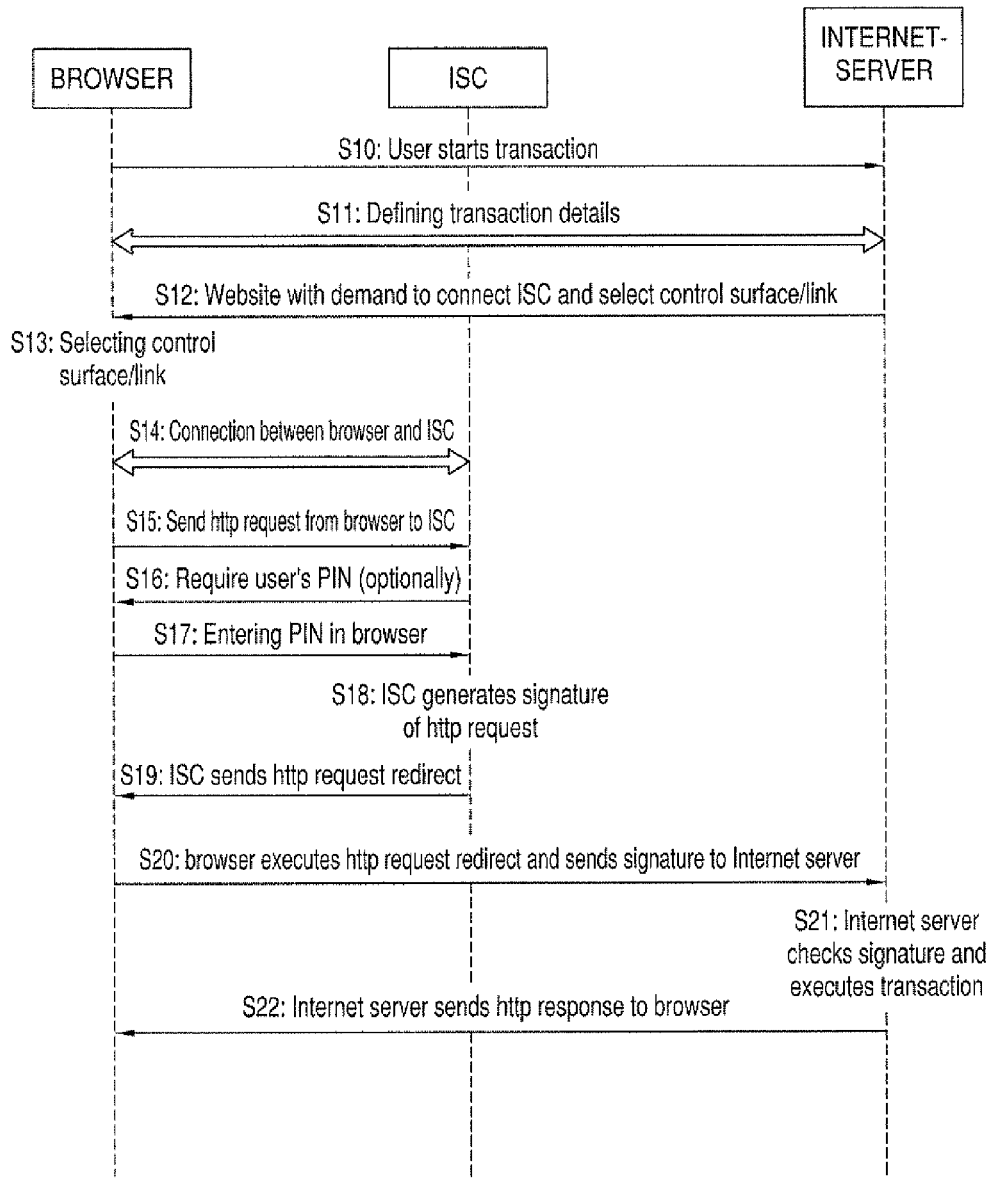
FIG. 2 a process according to the invention.

FIG. 2 shows a flow chart describing a possible interaction between a browser 7 of an Internet smart card 1 (ISC) and an Internet server 3 in greater detail. In step S10 the user of the computer 2 starts a desired transaction via a corresponding interaction with a browser of the computer 2. FIG. 2 thus illustrates the case that the transaction proceeds from the browser 7 and is not, as illustrated in FIG. 1, caused by the Internet smart card 1 via a prior transaction demand message.

In step S11 the transaction details are defined by means of an interaction between the browser 7 and the Internet server 3. Within the framework of this definition of transaction details it is possible that the user authenticates himself vis-à-vis the Internet server 3 via the browser 7 for example through a registration procedure with user name and password. In step S12 a web site is displayed on the browser 7 which demands from the user to connect his Internet smart card 1 via the USB interface 5 with the computer 2 and then to click on a control surface or a link on the web site. The control surface or link can for example contain the indication that subsequently a connection is established with the Internet smart card 1 so as to carry out the desired transaction.

In step S13 the user operates the control surface or the link and thereby causes a connection establishment between the browser 7 and the Internet smart card 1 via the interface 5. In step S14 the browser 7 then automatically initiates a connection with the Internet smart card 1, said connection being preferably specially protected, e.g. by an encryption/decryption of the data traffic (e.g. via the SSL protocol).

In step S15 an http request generated in step S13 through the user's operating the control surface or the link is sent to the Internet smart card 1, so that the transaction details defined in step S11 are provided to the Internet smart card 1 and its control device 4. These transaction details can e.g. concern the type of transaction or identification features of the transaction partners or represent random numbers for a cryptographic securing of the transaction. The transaction details can be transmitted in an encrypted state, since they do not need to be interpreted by the browser 7. The http request by the browser 7 to the Internet smart card 1 simultaneously comprises a demand to the Internet smart card 1 to authorize the transaction in such a fashion that this authorization can later (in step S21) be proven by the browser 7 vis-à-vis the Internet server 3 within the framework of the redirected http request.

In step S16 it is demanded of the user, when indicated, to authenticate himself vis-à-vis the Internet smart card 1, provided that this has not taken place up to this time or the user was automatically signed out due to a timeout. The user can for example register with the Internet smart card 1 by means of a personal identification number (PIN). For this purpose in step S17 the user enters his PIN in the browser 7 and said PIN is sent via the established connection with the Internet smart card to be checked there. Such an authentication of the user vis-à-vis the Internet smart card 1 can e.g. also take place via the "http basic authentication" or any desired other suitable mechanisms.

In step S18 the Internet smart card 1 or a suitable component, such as e.g. the control device 4 or a separate cryptography module, generates a signature for the desired transaction which represents authorization data by means of which the browser 7 proves to the Internet server 3 that the transaction was authorized by the Internet smart card 1. This signature can, in addition the pure transaction data, also comprise further data, such as e.g. a random number or the like.

In step S19 a request redirection message in the form of an http redirection message ("http redirect"), which can comprise further transaction data and/or payload data, is sent to the browser 7 in response to the http request from step S15. In particular the request redirection message comprises the signature generated in step S18. In step S20 the http redirection message is interpreted by the browser 7 and the redirected http request is sent to the Internet server 3 together with further transaction data and/or payload data from the request redirection message, in particular the signature required for the authorization of the transaction.

In step S21 the Internet server 3 receives the signature and checks whether the signature corresponds to the transaction represented by the redirected http request by the browser 7. In case of a correct signature the transaction initiated in step S10 is finally executed, so that finally in step S22 the result in the form of an http response is sent to the browser 7 and the user can be informed about the successful or rejected transaction.

The methods according to steps S1 to S6 and S10 to S22 are in particular also suitable for transmitting payload data from the Internet server 3 to the Internet smart card 1, e.g. updates of programs installed on the Internet smart card 1 or the like. In doing so, all transmitted data can be encrypted, so that they are available in an unencrypted state only to the Internet smart card 1 and the Internet server 3. In this case the browser assumes only the forwarding of the data in question and cannot decrypt them or interpret them in any other way.

The invention claimed is:

1. A method for carrying out a transaction in a communication network between a communication device and a network server via a portable data carrier connected with the communication device, comprising:
sending an http request concerning the transaction from a browser of the communication device to the data carrier;
in response to the http request sent from the browser of the communication device to the data carrier, the data carrier sending an http request redirection message concerning the transaction, over a local connection to only the browser of the communication device, and commanding the browser of the communication device to send a redirected http request to the network server,
wherein, in sending the http request redirection message and commanding the browser of the communication device to send the redirected http request to the network server, the communication device is not required to provide separate access to the network server for the data carrier,
wherein the browser of the communication device sends the redirected http request to the network server such that the data carrier does not require independent access to the communication network;
wherein the data carrier integrates in the http request redirection message transaction data which are integrated by the browser of the communication device into the redirected http request intended for the network server and are sent to the network server.

2. The method according to claim 1, wherein the http request redirection message comprises the address of the network server.

3. The method according to claim 1, including sending via the data carrier a transaction demand message to the communication device which causes the communication device to send the http request concerning the transaction to the data carrier.

4. The method according to claim 1, wherein the data carrier integrates into the http request redirection message as transaction data a signature concerning the transaction which allows the network server to check an authorization of the communication device or of the transaction.

5. The method according to claim 1, wherein the data carrier integrates into the http request redirection message as transaction data command data to the communication device or to the network server, or integrates payload data intended for the network server.

6. The method according to claim 5, wherein the data carrier integrates into the http request redirection message command data to the network server which concern a downloading of payload data present on the network server to the data carrier, with the network server sending the payload data to be downloaded to the communication device and the communication device forwarding the received payload data to be downloaded to the data carrier.

7. The method according to claim 5, wherein the data carrier integrates into the http request redirection message command data to the network server and payload data, with the command data concerning an uploading of the payload data to the network server, and the command data and the payload data being integrated by the communication device into the redirected request, and the network server storing the received payload data intended for uploading in such a manner that the payload data are accessible via the communication network.

8. The method according to claim 1, wherein a user of the communication device initiates the transaction by selecting a link displayed on a browser of the communication device and effects the sending of the http request to the data carrier by the browser, with the browser receiving the http request redirection message from the data carrier and integrating the transaction data or payload data of the http request redirection message into a redirected http request directed to the network server.

9. The method according to claim 8, including demanding by means of a display of the transaction demand message on the browser the user to initiate a transaction by selecting a control surface or link displayed on the browser and to send an http request concerning the transaction to the data carrier.

10. The method according to claim 8, wherein the user registers with the data carrier by entering an identification code in the browser and the browser establishes a secure communication connection between the communication device and the data carrier.

11. The method according to claim 8, wherein the transaction between the browser and the network server is carried out according to the http protocol.

12. The method according to claim 1, wherein the transaction is carried out via the Internet between a computer connected with an Internet smart card and a network server.

13. A portable data carrier comprising:
a memory, a communication interface, and a control device, the memory being a non-transitory medium that stores a set of instructions, which, when executed, cause the control device to enable a transaction in a communication network between a communication device connected with the data carrier via the communication interface and a network server;
wherein the control device is arranged to send, in response to an http request sent from the browser of the communication device to the data carrier concerning a transaction between the communication device and a network server received from the connected communication device via the communication interface, an http request redirection message concerning the transaction over a local connection to only a browser of the communication device,
wherein, in sending the http request redirection message and commanding the browser of the communication device to send the redirected http request to the network server, the portable data carrier does not require the communication device to provide separate access to the network server for the data carrier,
wherein the http request redirection message comprises transaction data which are suitable and intended for being sent to the network server by the communication device by means of a redirected http request, and
wherein the browser of the communication device sends the redirected http request such that the portable data carrier does not require independent access to the communication network.

14. The data carrier according to claim 13, wherein the control device is arranged to require the request concerning a transaction from a connected communication device to be made through a transaction demand message to the communication device, by means of which the communication device is commanded to send the request to the data carrier.

15. The data carrier according to claim 13, wherein the http request redirection message comprises as transaction data a signature concerning the transaction, said signature being suitable and intended for proving an authorization of the communication device or of the transaction vis-à-vis the network server.

16. A method for carrying out a transaction in a communication network between a communication device and a network server via a portable data carrier connected with the communication device, comprising:

sending an http request concerning the transaction from the communication device to the data carrier;

the data carrier, in response to the http request sent from the communication device to the data carrier, sending from the data carrier an http request redirection message, which concerns the transaction, and commanding a browser of the communication device to send a redirected http request to the network server;

wherein the data carrier integrates into the http request redirection message transaction data which are integrated by the communication device into the redirected http request intended for the network server, wherein the data carrier integrates in the http request redirection message as the transaction data a signature concerning the transaction which allows the network server to check an authorization of the communication device or of the transaction, and wherein the communication device sends the redirected http request to the network server.

* * * * *